United States Patent
Roy et al.

(10) Patent No.: US 12,057,114 B2
(45) Date of Patent: Aug. 6, 2024

(54) MEDIA CONTENT STEERING

(71) Applicant: Spotify AB, Stockholm (SE)

(72) Inventors: Bryan Roy, Boston, MA (US); Philip Edmonds, Arlington, MA (US); Matthew Joseph Kane, Salem, MA (US); Jennifer Thom-Santelli, Boston, MA (US); Neha Kothari, San Francisco, CA (US); Sarah Mennicken, San Francisco, CA (US); Karl Humphreys, London (GB); Ruth Brillman, Somerville, MA (US); Sravana Reddy, Cambridge, MA (US); Henriette Cramer, San Francisco, CA (US); Robert L. Williams, Arlington, MA (US); Rohit Kumar, Austin, TX (US)

(73) Assignee: Spotify AB, Stockholm (SE)

( * ) Notice: Subject to any disclaimer, the term of this patent is extended or adjusted under 35 U.S.C. 154(b) by 466 days.

(21) Appl. No.: 16/568,835

(22) Filed: Sep. 12, 2019

(65) Prior Publication Data

US 2020/0143805 A1 May 7, 2020

(30) Foreign Application Priority Data

Nov. 2, 2018 (SE) .................... 1851369-7

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 16/635* (2019.01);
(Continued)

(58) Field of Classification Search
CPC ... G10L 15/22; G10L 2015/223; G10L 15/26; G06F 3/165; G06F 16/635; G06F 16/639;
(Continued)

(56) References Cited

U.S. PATENT DOCUMENTS 9,865,240 B2 * 1/2018 Bauer .................... G06F 16/433
10,068,573 B1 * 9/2018 Aykac ..................... G06F 3/165
(Continued)

FOREIGN PATENT DOCUMENTS

AU 2013312361 B2 4/2015
WO 2007/022533 A2 2/2007
(Continued)

OTHER PUBLICATIONS

Office Action from corresponding Swedish Patent Appl'n No. 1851369-7, mailed Jun. 10, 2019.
(Continued)

*Primary Examiner* — Jonathan C Kim
(74) *Attorney, Agent, or Firm* — Merchant & Gould P.C.

(57) ABSTRACT

A media content steering solution is provided to identify a user query to steer playback of media content that is currently playing or has been played. The user steering query can include a voice request for playing media content that is relatively different from the media content being currently played or having been played. The media content steering solution analyzes the utterance of the user query and uses it to identify such different content that satisfies the user intent contained in the user query.

14 Claims, 8 Drawing Sheets

(51) Int. Cl.
*G06F 16/635* (2019.01)
*G06F 16/638* (2019.01)
*G06F 16/68* (2019.01)
*G06F 40/211* (2020.01)
*G10L 15/26* (2006.01)

(52) U.S. Cl.
CPC .......... *G06F 16/639* (2019.01); *G06F 16/686* (2019.01); *G06F 40/211* (2020.01); *G10L 15/26* (2013.01); *G10L 2015/223* (2013.01)

(58) Field of Classification Search
CPC .... G06F 16/686; G06F 40/211; G06F 16/433; G11B 27/34; G11B 27/327
See application file for complete search history.

(56) References Cited

U.S. PATENT DOCUMENTS

| | | | | |
|---|---|---|---|---|
| 10,249,300 | B2* | 4/2019 | Booker | G10L 13/02 |
| 10,318,236 | B1* | 6/2019 | Pal | G06F 40/56 |
| 10,453,117 | B1* | 10/2019 | Reavely | G06N 5/027 |
| 10,504,513 | B1* | 12/2019 | Gray | G10L 15/1815 |
| 10,885,091 | B1* | 1/2021 | Meng | G06F 16/24578 |
| 11,086,936 | B2 | 8/2021 | Lamere et al. | |
| 2006/0212478 | A1* | 9/2006 | Plastina | G11B 27/34 |
| 2007/0089057 | A1* | 4/2007 | Kindig | G06F 16/686 |
| | | | | 715/716 |
| 2008/0200310 | A1* | 8/2008 | Tagliabue | A61B 5/7405 |
| | | | | 342/357.57 |
| 2009/0076821 | A1* | 3/2009 | Brenner | G06F 16/64 |
| | | | | 707/999.001 |
| 2010/0088100 | A1* | 4/2010 | Lindahl | G10L 21/06 |
| | | | | 704/E15.04 |
| 2013/0228063 | A1* | 9/2013 | Turner | G10H 7/00 |
| | | | | 84/612 |
| 2014/0207446 | A1* | 7/2014 | Klein | G10L 15/22 |
| | | | | 704/233 |
| 2014/0324901 | A1* | 10/2014 | Walther | G06F 16/2425 |
| | | | | 707/758 |
| 2016/0379638 | A1* | 12/2016 | Basye | G10L 15/22 |
| | | | | 704/235 |
| 2017/0025120 | A1 | 2/2017 | Dayan et al. | |
| 2017/0068423 | A1 | 3/2017 | Napolitano et al. | |
| 2017/0243576 | A1* | 8/2017 | Millington | G10L 15/30 |
| 2017/0358302 | A1* | 12/2017 | Orr | G06F 16/435 |
| 2018/0182380 | A1* | 6/2018 | Fritz | G10L 15/30 |
| 2018/0308486 | A1 | 10/2018 | Saddler et al. | |
| 2018/0349011 | A1* | 12/2018 | Morag | G06F 3/04847 |
| 2019/0147052 | A1* | 5/2019 | Lu | G10L 15/22 |
| | | | | 707/722 |
| 2019/0320260 | A1* | 10/2019 | Alders | H04R 3/005 |
| 2020/0026489 | A1* | 1/2020 | Bromand | G06F 3/167 |
| 2020/0143805 | A1* | 5/2020 | Roy | G11B 27/34 |
| 2021/0117624 | A1* | 4/2021 | Aghajanyan | G10L 15/30 |
| 2021/0208842 | A1* | 7/2021 | Cassidy | G05B 15/02 |

FOREIGN PATENT DOCUMENTS

| | | |
|---|---|---|
| WO | 2008/051643 A1 | 5/2008 |
| WO | 2016/209924 A1 | 12/2016 |

OTHER PUBLICATIONS

Extended European Search Report from European Appl'n No. 19206103.4, mailed Mar. 27, 2020.

Celma, O. and Lamere, P., "If You Like Radiohead, You Might Like This Article." AI Magazine, 32(3), 57-66 (2011). https://doi.org/10.1609/aimag.v32i3.2363.

Bakhshandeh, O. and Allen, J., "Semantic framework for comparison structures in natural language." Proceedings of the 2015 Conf. on Empirical Methods in Natural Language Processing, 993-1002 (2015).

Mortenson et al. "Real-Wordl Mood-Based Music Recommendation" Info. Retrieval Tech. (Jan. 15, 2008), pp. 514-519.

\* cited by examiner

MEDIA CONTENT STEERING

This application claims benefit of Serial No. 1851369-7, filed Nov. 2, 2018 in Sweden, which is incorporated herein by reference. To the extent appropriate, a claim of priority is made to the above-disclosed application.

BACKGROUND

Media playback devices are used to receive streams of media content across networks from streaming services. The streaming services, in turn, provide media playback devices with access to relatively large collections of media content. The streaming services store the media content on servers remote from the media playback devices and then send the media content to the electronic devices when requested. Typically, a media playback device sends a server of the streaming service a playback request including an identification of media content to play.

Media content is information that is expressed as various forms, such as music, speech, writing, or any other arts. Media content is deliverable through a medium of various types, such as the Internet, mobile devices, CDs, DVDs, books, e-books, magazines, cinema, and live events. Examples of media content include songs, albums, videos, movies, radio stations, TV stations, TV shows, books, video games and the like.

Different pieces of media content are referred to as media content items that are typically identifiable through use of media content item identifiers. Each media content item is thus retrievable for playback via use of a media content item identifier thereof. A media content item can be also referred to as a media object, multimedia object, or the like.

One or more media content items can be grouped and identified as a whole as a media context to provide a particular context to the group of media content items. Examples of media contexts include playlists, albums, artists, stations, search result lists, and other things suitable to suggest context of media playback. In some examples, a media context includes one or more media content item identifiers for identifying the media content items associated with the media context. In some examples, a media context itself is identifiable through use of an identifier of the media content (also referred to herein as a media context identifier) and retrievable for playback via use of the media context identifier thereof.

When particular media content, such as a media content item or a media context, is being played via a media playback device, a user may want to listen to other media content that is relatively different from the currently-playing media content. For example, when listening to media content via a voice-enabled media playback device, a user can provide a voice command to change the playback to different media content. A voice command as used herein is a verbal instruction that is used to control a device. In some embodiments, a voice command is used to control a media playback device or a media delivery system via the media playback device.

Known media devices and streaming services typically receive user input (e.g., a user query) via a verbal or tactile input interface to change playback of media content. Existing media content recommendation techniques include mood-based recommendations systems as found in Mortensen, et al., *Real-World Mood-Based Recommendation*, AIRS 2008: Information Retrieval Technology, pp. 514-519.

While various media content recommendation techniques exist, such techniques do not provide for media content recommendation or search in conjunction with comparative-type instructions that include terms such as such as "more", "less", "faster", "slower" and the like. When a user utters "play something upbeat," typical services return a static playlist of music that is already defined as "upbeat" and is not relative to the user's currently listening media content. For example, if a user initially requests a service to play "some sad classical music," it will play a playlist such as "Solemn Classical Music" and play "Gymnopédie No. 1", by Erik Satie. But if, during the playback of this piece, the service is requested to play "something more upbeat," it will not play more upbeat classical music but rather play media content that is very distant relative to, for example, genre, such as "Country Party Soundtrack" and play, for example, "This is How We Roll" by Florida Georgia Line.

Further, such a static playlist is not personalized to an account through which the request is made. For example, it is not personalized to the known or predicted preferences or activity of the account holder.

What is needed is a solution that identifies a voice command as a command containing comparative-type instructions, and determines media content in accordance with that voice command, particularly media content that is relatively different from the media content being currently played or queued to be played, where the relative difference is bounded by certain constraints.

The technical problem resides in the user interface. Existing interfaces of media playback devices and streaming services perform only simplistic interpretations of voice commands and lack the ability to identify utterances containing comparative-type instructions and process them to playback media content in any given direction that is constrained by the attributes of the media content items that are currently playing or queued to be played. Therefore, the existing solutions do not return media content items that accurately reflect the user's command relative to the media content items being currently played or queued to be played.

Further, if search results are not satisfactory, users typically retry searching with other voice commands, and accordingly the systems run searches multiple times, until the systems provide media content items that meet the users' expectations. Such multiple searches waste computing power, network and database resources, and cause inferior user experience.

Another technical problem resides in the recommendation component. Because known recommendation components of streaming devices and services are limited to such simplistic interpretations, they lack the ability to analyze, parse and interpret multiple parts of the utterance to provide them with the additional information needed to change playback of media content to an appropriate direction and not stray too far from media content attributes of the media content item currently playing or queued to be played.

There exists, therefore, a need for improved technology that responds to user queries with comparative-type instructions associated with media content playback.

SUMMARY

In general terms, the present disclosure is directed to media content steering. In one possible configuration and by non-limiting example, the media content steering provides a solution to receive a user request for steering playback of media content and provide relatively different media content based on the user request. Various aspects are described in this disclosure, which include, but are not limited to, the following aspects.

According to an aspect of the present invention, there is provided a media playback system comprising a media playback device operable to play media content, and a media delivery system. The media delivery system is configured to receive an utterance from the media playback device. The media delivery system is also configured to identify at least one first media content item that is currently being played by the media playback device, the at least one first media content item having a first facet, the first facet having a first facet type and a first facet value. The media delivery system is also configured to parse the utterance into parts including information. The media delivery system is also configured to retrieve at least one second media content item from a catalog of media content items, the at least one second media content item having a second facet, the second facet having a second facet type and a second facet value, the second facet type being the same as the first facet type and the second facet value being different from the first facet value, the difference being representative of at least part of the information in the parsed utterance. The media delivery system is also configured to transmit the second media content item to the media playback device.

According to another aspect of the present invention, there is provided a method performed by a media content steering engine of a media delivery system connected to a media playback device via a data communication network. The method comprises, from the media playback device, receiving a steering command from a user of said media playback device. The method also comprises, based on the received steering command, identifying a media content facet type. The method also comprises, for a first media content item which is currently playing on the media playback device, determining a first facet value of the identified facet type The method also comprises, based on the received steering command and in relation to the determined first facet value, selecting a second media content item having a second facet value of said identified facet type, different from the first facet value. The method also comprises, providing the second media content item to the media playback device in response to the received steering command.

In some embodiments of the present invention, the steering command is obtained from an utterance received from the media playback device in voice (i.e. audio) or text format. In some embodiments, the utterance is parsed before the steering command is obtained there from. According to another aspect of the present invention, there is provided a media delivery system provided with means for performing an embodiment of the method performed by a media content steering engine of the present disclosure.

According to another aspect of the present invention, there is provided a computer program product comprising computer-executable components for causing a media delivery system to perform an embodiment of a method of the present disclosure when the computer-executable components are run on processing circuitry comprised in the media delivery system.

According to another aspect of the present invention, there is provided a method performed by a media playback device connected to a media delivery system via a data communication network. The method comprises, from a user of the media playback device, receiving a steering command. The method also comprises, based on the received steering command, identifying a media content facet type. The method also comprises, for a first media content item which is currently playing on the media playback device, determining a first facet value of the identified facet type. The method also comprises transmitting the received steering command to the media delivery system. The method also comprises, in response to the transmitted steering command, obtaining a second media content item having a second facet value of said identified facet type, different from the first facet value. The method also comprises, playing said second media content item. Thus, in different embodiments of the present invention, some method steps may be performed in the media playback device instead of, or in addition to, in the media delivery system.

According to another aspect of the present invention, there is provided a media playback device comprising means for performing an embodiment of the method which is performed by a media playback device, in accordance with the present disclosure.

According to another aspect of the present invention, there is provided a computer program product comprising computer-executable components for causing a media playback device to perform an embodiment of a method of the present disclosure when the computer-executable components are run on processing circuitry comprised in the media playback device.

Some further aspects of the present invention are presented below.

One aspect is a method for playing media content. The method may include receiving an utterance, and identifying at least one first media content item that is currently being played. The first media content item may have a first facet that has a first facet type and a first facet value. The method may further include determining an intent and a slot from the utterance. The method may further include retrieving at least one second media content item from a catalog of media content items. The second media content item may have a second facet that has a second facet type and a second facet value. The second facet type may be the same as the first facet type. The second facet value may be different from the first facet value. The difference may represent at least one of the intent and the slot of the utterance.

In certain examples, the method may further include determining the first facet type and the second facet type based on at least one of the intent and the slot of the utterance.

In certain examples, the method may further include determining a slot type and a slot value from the slot, and determining the first facet type and the second facet type based on the slot type.

In certain examples, the first media content item has a plurality of facets including the first facet, and each facet has a facet type and a facet value. The second media content item has a plurality of facets including the second facet, and each facet has a facet type and a facet value. In certain examples, at least some of the facet types in the one second media content item are the same as at least some of the facet types in the first media content item. In certain examples, the facet values, other than the first facet value, of the at least some of the facet types in the second media content item are the same as the facet values, other than the second facet value, of the at least some of the facet types in the first media content item.

In certain examples, the method may further include identifying a media content steering intent from the utterance. The media content steering intent includes a command to retrieve at least one media content item having a facet that has a different facet value from a corresponding facet of at least one currently-playing media content item.

In certain examples, the method may further include retrieving user information associated with a user who provide the utterance. The second facet value of the second media content item may be determined based on the user profile.

In certain examples, the method may further include, prior to receiving the utterance, transmitting a media content signal to a voice-enabled device for playing the at least one first media content item. The method may further include receiving the utterance from the voice-enabled device, and converting the utterance to a text version. The intent and the slot of the utterance may be determined from the text version.

In certain examples, the first facet type and the second facet type include at least one of mood, genre, activity, tempo, acoustic attributes, artists, popularity, geographic information, release date, hits, and deep cuts.

In certain examples, the first media content item is a first media content playlist including a plurality of first tracks. In certain examples, the second media content item is a second media content playlist including a plurality of second tracks.

In certain examples, the first media content item is included in a first media content playlist. In certain examples, the second media content item is included in a second media content playlist.

Another aspect is a computer-readable medium having stored thereon instructions that, when executed by one or more processors cause execution of operations including receiving an utterance, and identifying at least one first media content item that is currently being played. The at least one first media content item has a first facet, and the first facet has a first facet type and a first facet value. The operations may further include determining an intent and a slot from the utterance. The operations may further include retrieving at least one second media content item from a catalog of media content items. The at least one second media content item has a second facet, and the second facet has a second facet type and a second facet value. The second facet type may be the same as the first facet type. The second facet value may be different from the first facet value. The difference may be representative of at least one of the intent and the slot of the utterance.

In certain examples, the operations may further include determining a slot type and a slot value from the slot, and determining the first facet type and the second facet type based on the slot type.

In certain examples, wherein the at least one first media content item has a plurality of facets including the first facet, and each facet has a facet type and a facet value. The at least one second media content item has a plurality of facets including the second facet, and each facet having a facet type and a facet value. In certain examples, at least some of the facet types in the at least one second media content item may be the same as at least some of the facet types in the at least one first media content item. In certain examples, the facet values, other than the first facet value, of the at least some of the facet types in the at least one second media content item may be the same as the facet values, other than the second facet value, of the at least some of the facet types in the at least one first media content item.

In certain examples, the operations may further include identifying a media content steering intent from the utterance. The media content steering intent includes a command to retrieve at least one media content item having a facet that has a different facet value from a corresponding facet of at least one currently-playing media content item.

In certain examples, the operations may further include retrieving user information associated with a user who provide the utterance. The second facet value of the at least one second media content item may be determined based on the user profile.

In certain examples, the operations may further include, prior to receiving the utterance, transmitting a media content signal to a voice-enabled device for playing the at least one first media content item. The operations may further include receiving the utterance from the voice-enabled device, and converting the utterance to a text version. The intent and the slot of the utterance may be determined from the text version.

Still another aspect is a media playback system including a media playback device operable to play media content, and a media delivery system. The media delivery system may operate to receive an utterance from the media playback device; identify at least one first media content item that is currently being played, the at least one first media content item having a first facet, the first facet having a first facet type and a first facet value; determine an intent and a slot from the utterance; retrieve at least one second media content item from a catalog of media content items, the at least one second media content item having a second facet, the second facet having a second facet type and a second facet value, the second facet type being the same as the first facet type, and the second facet value being different from the first facet value, the difference representative of at least one of the intent and the slot of the utterance; and transmit the second media content item to the media playback device.

In certain examples, the media delivery system further operates to: prior to receiving the utterance, transmit a media content signal to the media playback device for playing the first media content item; receive the utterance from the media playback device; and convert the utterance to a text version, the intent and the slot of the utterance being determined from the text version.

In certain examples, the media delivery system further operates to: determine a slot type and a slot value from the slot; and determine the first facet type and the second facet type based on the slot type.

In certain examples, the at least one first media content item has a plurality of facets including the first facet that has a facet type and a facet value. The at least one second media content item has a plurality of facets including the second facet that has a facet type and a facet value. In certain examples, at least some of the facet types in the at least one second media content item are the same as at least some of the facet types in the at least one first media content item. In certain examples, the facet values, other than the first facet value, of the at least some of the facet types in the at least one second media content item are the same as the facet values, other than the second facet value, of the at least some of the facet types in the at least one first media content item.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
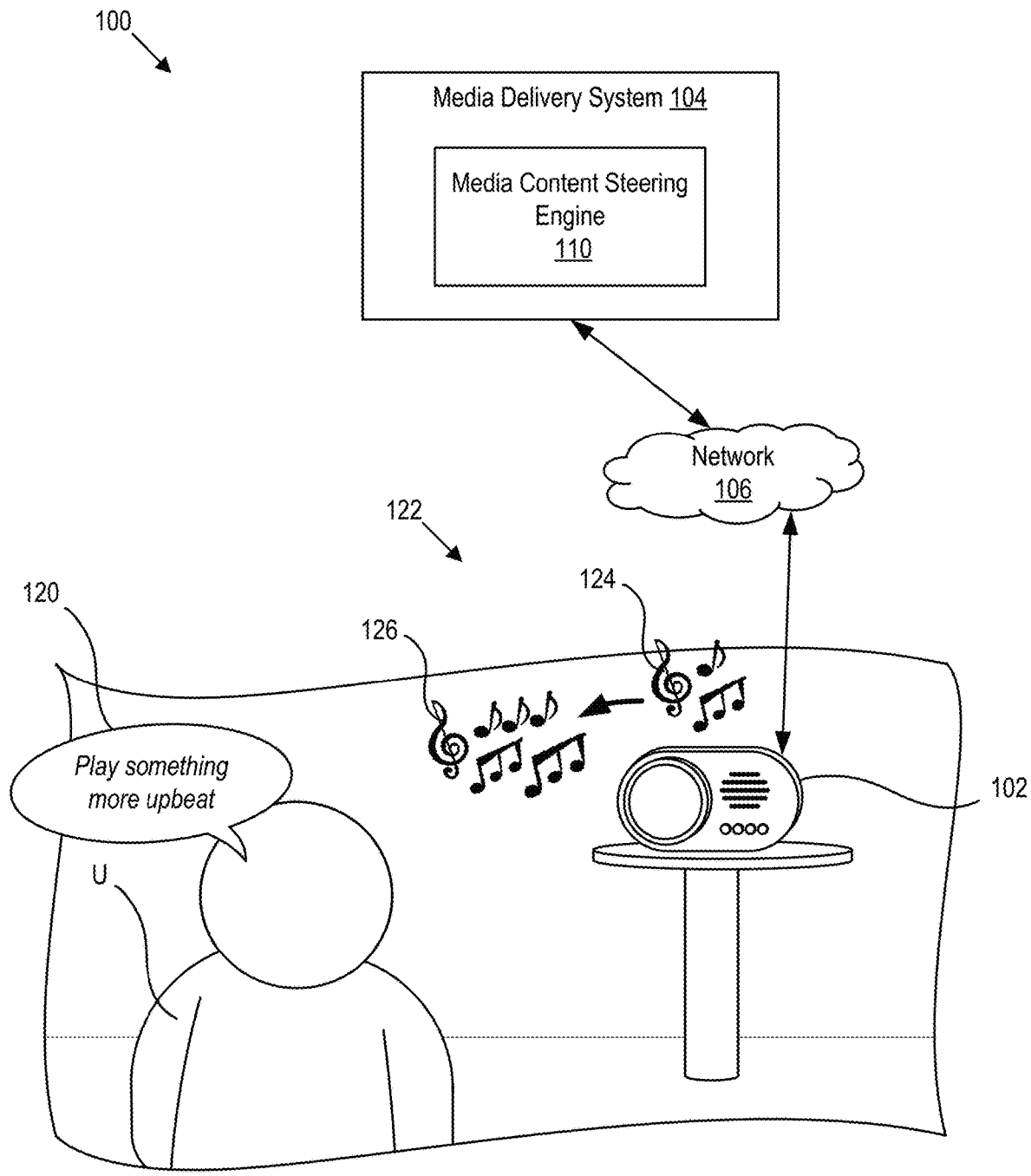
FIG. 1 illustrates an example media playback system for providing media content to a user.

Various embodiments will be described in detail with reference to the drawings, wherein like reference numerals represent like parts and assemblies throughout the several views.

The example embodiments of the invention presented herein are directed to methods, systems and computer program products for media content steering. Aspects of the embodiments identify a steering command and determine media content in accordance with that steering command, particularly media content that is relatively different from the media content being currently played or queued to be played. In some examples, the relative difference is constrained by a distance between one or more media content attributes of the media content item currently playing or queued to be played and the steering command.

A steering command is a voice command from a user to steer a session being played (sometimes referred to as a "playback session" or "listening session") or queued to be played. In other embodiments, a steering command can be provided in other formats, such as a text-based input or other tactile input.

A steering command from an utterance is identified and processed to determine what media content to playback next. An utterance of the steering command (e.g., in the form of a user query) is parsed, and a search for media content items that meets the steering command is performed.

The terms utter, utterance and speak generally refer to a spoken word, statement or vocal sound that is used to convey information. Unless a specific meaning is specified for a given use of the terms "utter", "utterance", and "speak", they should be construed to mean any of these senses of the word, all of which are understood as a plain meaning of the terms "utter", "utterance", and "speak" by those having ordinary skill in the art.

In some embodiments, an utterance of a user query is converted into a text which is then parsed into an intent and one or more slots.

An intent in the utterance describes a general intent of the text version of the utterance.

A "slot" as used herein is in reference to an utterance. A slot describes a portion of the text version of the utterance having a specific meaning. In some embodiments, a slot includes a key-value pair. The key-value pair of a slot is also sometimes referred to herein as a pair of slot type and slot value, where the slot type is the key portion of the pair and the slot value is the value portion of the pair. By way of example, where an utterance is "play more upbeat," the slot can be "more upbeat" and expressed as a key-value pair of {mood:upbeat}.

A "facet" as used herein is in reference to a media content item. A facet of a media content item describes an attribute of that media content item. In some embodiments, a facet includes a key-value pair which can include a facet type (as a key) and a facet value (as a value). In certain examples, to determine recommended media content items, the existing solutions retrieve one or more media content items from a catalog of media content items and analyze facets of the retrieved media content items based on the parsed utterance of the user query, such as the intent and/or the slot(s) of the utterance.

Examples of a facet type include information associated with the acoustic attributes (e.g., temporal information such as tempo, rhythm, beats, downbeats, tatums, patterns, sections, or other structures; and acoustic information such as melody, pitch, harmony, timbre, chroma, loudness, vocalness, or other possible features), cultural information (e.g., styles, genres, moods, themes, similar artists and/or songs, rankings, hits, opinion, popularity, activities, social signaling, deep cuts, or any other information), explicit information (e.g., song titles, artist and composer names, other credits, release date, time period, era, epoch, recording label, organizational, album cover art, locale, geographical information, instrumentation, publisher name and product number, and any other information), and any other information available for media content.

The facet values include values for the corresponding facet types. Therefore, a facet is expressed as a key-value pair between a facet type and one or more facet values, such as: {tempo:60 bpm} or {genre:rock}.

In some embodiments, a media content item has a plurality of facets that describe various attributes of the media content items. Each media content item can have a plurality of facets, each of which includes a pair of facet type and facet value. In some embodiments, facets of a media content item can be obtained from metadata associated with the media content item. Facets can be obtained in other ways in other embodiments.

The steering command can be a voice command that is used to control either a media playback device or a media delivery system via the media playback device. The steering command is particularly a voice command that steers the session being played or queued to be played. The steering command causes the media playback device (and/or media delivery system as the case may be) to play back media content that is relatively different from the media content being currently played. In certain examples, the steered media content may be personalized to the user.

In a non-limiting example, a user utters the steering command "play more upbeat" to a media playback device while the media playback device is playing a first media content item. A voice recognition system, for example trained with a natural language understanding (NLU) model, analyzes the utterance ("play more upbeat"), transcribes the utterance into text and parses the utterance into its parts, the parts of which have syntactic roles. In some embodiments, the utterance is parsed into an intent and one or more slots. In this example, the intent is identified as a play-intent type intent (e.g., "play"). A play-intent indicates an intent of a user to play back media content. Alternatively, the intent in this example is identified as a steering intent (e.g., "play more . . . "). A steering intent is an intent of a user to steer playback of media content to certain direction. For example, a steering intent represents a user request for retrieving a second media content item that is relatively different from the first media content item. In the same example, the slot of the utterance "play more upbeat" is expressed as a key-value pair of {mood: upbeat}.

It should be understood that the terms utter, utterance and speak generally refer to a spoken word, statement or vocal sound that is used to convey information. Unless a specific meaning is specified for a given use of the terms "utter", "utterance", and "speak", they should be construed to mean any of these senses of the word, all of which are understood as a plain meaning of the terms "utter", "utterance", and "speak" by those having ordinary skill in the art.

The parsed utterance, which include the intent and the slots, is used to identify at least one facet of the first media content item that matches, or is relevant to, at least part of the information in the parsed utterance. Once the facet of the first media content item is identified, the second media content item is determined which has a corresponding facet with a relatively different value thereof. As such, in the example embodiments described herein, facets are evaluated in view of the parsed utterance, and used to identify the second media content item that is relatively different from the first media content item and will be steered from the first media content item.

In some embodiments, the first media content item can have multiple facets, each of which has a pair of facet type and a facet value. The second media content item, which will be steered from the first media content item, is determined by comparing at least one facet of the first media content item and at least one facet of the second media content item.

Prior to the comparison, the facets being compared between the first media content item and the second media content item can be determined. The facets being compared between the first media content item and the second media content item can be determined based at least in part on the parsed utterance. In one example embodiment, the parsed utterance includes an intent and/or a slot. An intent, as described above, describes a general intent of the text version of the utterance. In this example, a slot of an utterance determines which facet of a first media content item should be considered.

In the case where the slot includes a slot type (i.e., key) of "mood" and a slot-value of "upbeat", the slot type (i.e., "mood") causes a tempo to be considered. For example, when the media playback device (and/or media delivery system as the case may be) determines that a slot contains a slot type of "mood", a determination is made as to which attribute to process. In this case, the attribute could be, for example, a tempo. If other facets are available, the slot type of the utterance causes the tempo to be considered among other facets as well. The second media content item can then be determined based on this identified facet type (i.e., tempo). For example, the second media content item is selected to have the same facet type (e.g., tempo) as the first media content item, and further have a facet value for that facet type that is relatively different from that of the first media content item. In some exemplary embodiments, this selection for the second media content item based on the identified facet type can be performed regardless of whether the other facets of the first media content item are at least partially identical to, or different from, the corresponding facets of the second media content item. In other embodiments, the second media content item is selected such that at least one of the other facets remain the same or similar between the first media content item and the second media content item. In this example, the second media content item is determined to have a higher tempo that the tempo value of the first media content item, in order to suit the user request for "more upbeat" songs.

In certain exemplary embodiments, a playback session may be steered substantially instantaneously upon receipt of a steering command. In other exemplary embodiments, steering of the playback session can be delayed to certain point in time (e.g., until after the media content item currently being played has finished). The playback session may be executed in any number of given manners. For example, the playback session is performed solely by the media playback device, by the media playback device in conjunction with a media delivery system, or solely by the media delivery system which is capable of receiving either the steering command itself or a derivative of the steering command.

The solution of the present disclosure is similarly applicable to a situation where a media context, or any other format of media content, is to be steered based on a steering command from a user.

As such, the solution of the present application allows to a user to modify upcoming recommendations that are based on the currently playing media content by simply uttering a voice command containing comparative terms. The solution can effectively identify a steering command from the utterance of the voice command. In response to the steering command, the solution can determine a media content item that will be steered, by considering the utterance and also evaluating and comparing both facets of a currently-playing media content item and facets of media content items from a catalog. This eliminates multiple searches in media content database via networks, and provides an effective and fast solution to search for a media content item having an attribute relatively different from that of the currently-playing media content item, according to the comparative terms contained in the steering command.

The solution of the present application is described and illustrated in more detail with some exemplary embodiments below.

FIG. 1 illustrates an example media playback system 100 for providing media content to a user U. The system 100 includes a media playback device 102, a media delivery system 104, and a data communication network 106. The media delivery system 104 includes a media content steering engine 110. An example user query 120 and a media output 122 are also shown. As described herein, the media output 122 can change from a first media content item 124 to a second media content item 126 when the user query 120 includes a media content steering query.

The media playback device 102 operates to provide media content to a user U. As described herein, the media playback device 102 operates to receive the user query 120 and provide the media output 122 to the user U according to the user query 120. In some embodiments, the media playback device 102 operates to communicate with a system external to the media playback device 102, such as the media delivery system 104. The media playback device 102 can interact with the media delivery system 104 to process the user query 120 and identify media content in response to the user query 120. In some embodiments, the media playback device 102 operates to receive the media content that is identified and provided (e.g., streamed, transmitted, etc.) by the media delivery system 104. In some embodiments, the media playback device 102 operates to play the media content and generate the media output 122 using a media output device (e.g., a speaker) therein. In other embodiments, the media playback device 102 operates to transmit the media content to another device for playback, such as an external speaker or another media playback device (e.g., a vehicle entertainment system or a home entertainment system). An example of the media playback device 102 is illustrated and described in more detail herein, such as with reference to FIG. 2.

The media delivery system 104 operates to provide media content to one or more media playback devices, such as the media playback device 102, via the network 106. An example of the media delivery system 104 is illustrated and described in further detail herein, such as with reference to FIG. 2.

The network 106 is a data communication network that facilitates data communication between the media playback device 102 and the media delivery system 104. The network 106 typically includes a set of computing devices and communication links between the computing devices. The computing devices in the network 106 use the links to enable communication among the computing devices in the network. The network 106 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of communication links. For example, the network 106 can include wired and/or wireless links, including cellular, Bluetooth®, Wi-Fi®, ultra-wideband (UWB), 802.11, ZigBee, near field communication (NFC), an ultrasonic data transmission, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (WAN) (such as the Internet), or can be implemented at another scale. Further, in some embodiments, the network 106 includes multiple networks, which may be of the same type or of multiple different types.

Referring still to FIG. 1, in some embodiments, the media delivery system 104 includes the media content steering engine 110 that operates to change media content of the media output 122 in response to the user query 120.

As described herein, the user query 120 may include a media content steering query from the user U. In this document, therefore, the user query 120 can be referred to a media content steering query, a steering query, or the like. The media content steering query 120 is a request for playback of media content having one or more attributes different from those of other media content. In this example, such other media content can be represented as the first media content item 124, and the media content steered from the first media content item 124 can be represented as the second media content item 126.

The media content steering query 120 can be received either when media content is currently playing, or when no media content is currently playing. In some embodiments, when the first media content item 124 is being played via the media playback device 102, the media content steering query 120 is a request for determining a media content item (e.g., the second media content item 126) that is different from the first media content item 124 in one or more attributes. Such different attributes can be determined based at least in part on information contained in the media content steering query 120. In other embodiments, when no media content item is currently played, the media content steering query 120 can refer to media content that has been previously played. For example, the media content steering query 120 can be a request for determining a media content item (e.g., the second media content item 126) that is different from the first media content item 124, which has been previously played.

Figure 2:
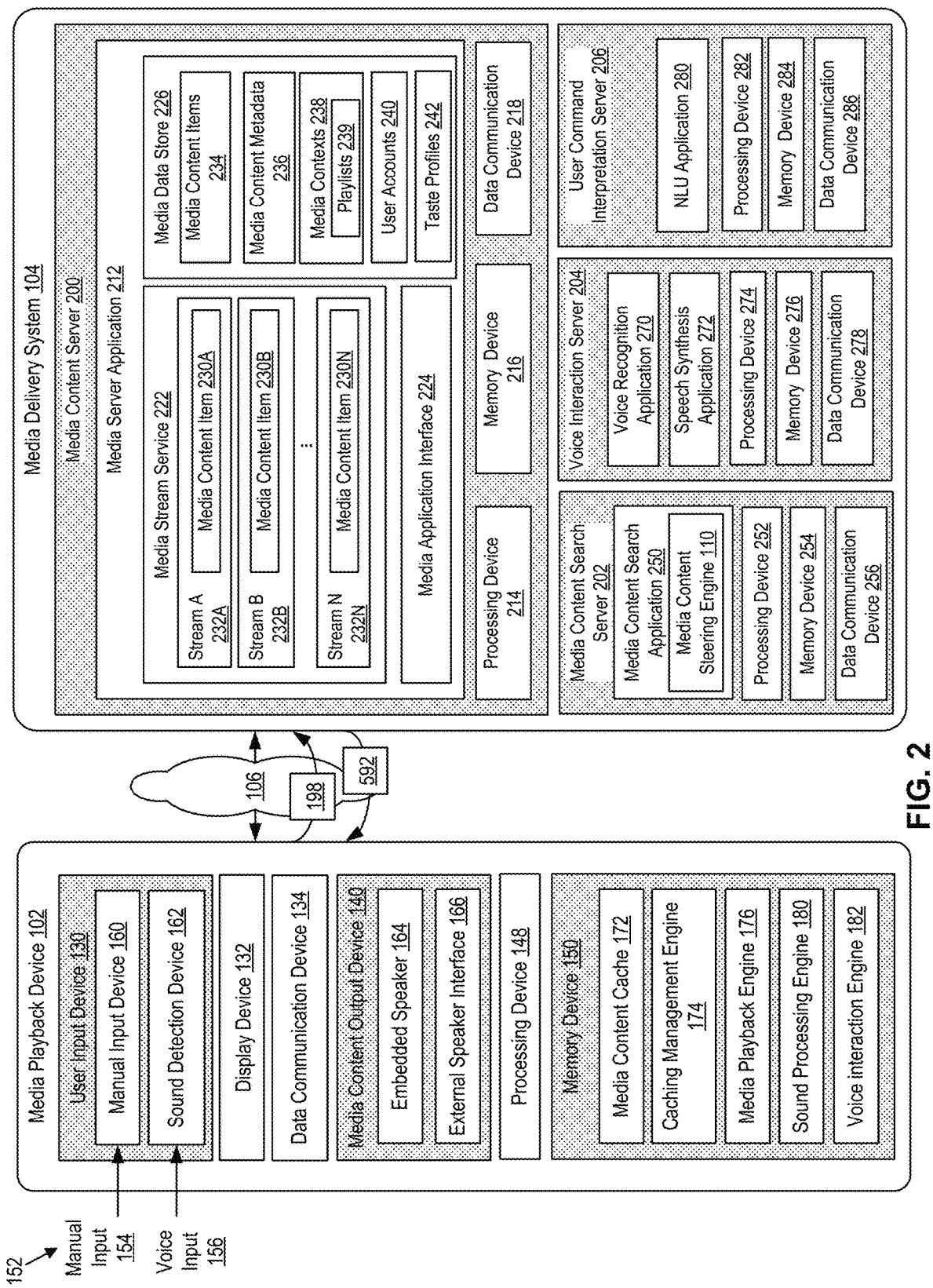
FIG. 2 is a block diagram of an example embodiment of a media playback device shown in FIG. 1.

In this document, the media content that is currently playing, queued to be played, or has been previously played can be represented as the first media content item 124 as illustrated in FIG. 1. In addition, the media content that will be steered from the first media content item 124 in response to the user query 120 can be represented as the second media content item 126 as illustrated in FIG. 1. The first media content item 124 and the second media content item 126 can be of various types. In some embodiments, the first media content item 124 and/or the second media content item 126 can be media content items 230, 234 (FIG. 2). Alternatively, the first media content item 124 and/or the second media content item 126 can be playlists 239 (FIG. 2). In still other embodiments, the first media content item 124 and/or the second media content item 126 can be of other types of media contexts 238.

In some embodiments, as illustrated in FIG. 1, the user query 120 can be a voice request received through a sound detection device (e.g., a microphone). As described herein, the voice request can be processed into a text query suitable for media content search. In other embodiments, the user query 120 can be a text that is typed using the media playback device 102 or another computing device.

In some embodiments, the media content steering query 120 includes one or more relative words or phrases (also referred to herein as relative terms or descriptors, or comparative words, phrases, terms, or descriptors) that can be used as one or more keywords to identify media content (e.g., the second media content item 126) to be steered from the currently-playing or previously-played media content (e.g., the first media content item 124). In the illustrated example of FIG. 1, the media content steering query 120 can be a voice request that is converted into a text query of "play something more upbeat." In this example, the relative term in the steering query 120 can include "more" or "more upbeat." By way of other examples, a media content steering query 120, such as "play something new" and "only play the popular songs," can also be considered as a media content steering query 120 as they include relative terms, such as "new" (or "something new" or their variants) and "only" (or "only . . . popular" or their variants) respectively. Other examples are also possible.

The media content steering engine 110 can operate to identify the user query 120 as a media content steering query and determine media content based at least in part on the information contained in the user query 120. In the illustrated example of the user query 120 of "play something more upbeat," the media content steering engine 110 can identify the comparative term "more" (or "more upbeat") and determine the second media content item 126 having an attribute that provides a more upbeat mood than the first media content item 124. An example of the media content steering engine 110 is illustrated and described in more detail herein, such as with reference to FIG. 3.

FIG. 2 is a block diagram of an example embodiment of the media playback device 102 of the system 100 shown in FIG. 1. In this example, the media playback device 102 includes a user input device 130, a display device 132, a wireless data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio.

The user input device 130 operates to receive a user input 152 from a user U for controlling the media playback device 102. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of the user query 120. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a voice of a user (also referred to herein as an utterance) for controlling playback of media content via the media playback device 102. For example, the voice input 156 includes a voice version of the user query 120 received from the sound detection device 162 of the media playback device 102. In addition, the voice input 156 is a voice of a user for managing various data transmitted via the media playback device 102 and/or controlling other functions or aspects associated with the media playback device 102.

In some embodiments, the sounds detected by the sound detection device 162 can be processed by the sound processing engine 180 of the media playback device 102 as described below.

Referring still to FIG. 2, the display device 132 operates to display information to the user U. Examples of such information include media content playback information, notifications, and other information. In some embodiments, the display screen 132 is configured as a touch sensitive display and includes the manual input device 160 of the user input device 130 for receiving the manual input 154 from a selector (e.g., a finger, stylus etc.) controlled by the user U. In some embodiments, therefore, the display screen 132 operates as both a display device and a user input device. The touch sensitive display screen 132 operates to detect inputs based on one or both of touches and near-touches. In some embodiments, the display screen 132 displays a graphical user interface for interacting with the media playback device 102. Other embodiments of the display screen 132 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 106. For example, the data communication device 134 is configured to communicate with the media delivery system 104 and receive media content from the media delivery system 104 at least partially via the network 106. The data communication device 134 can be a network interface of various types which connects the media playback device 102 to the network 106. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 generates the media output 122 for the user U. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that the media output 122 is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media playback engine 176, a sound processing engine 180, and a voice interaction engine 182.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content to the user U. As described herein, the media playback engine 176 is configured to communicate with the media delivery system 104 to receive one or more media content items (e.g., through the media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

The sound processing engine 180 is configured to receive sound signals obtained from the sound detection device 162 and process the sound signals to identify different sources of the sounds received via the sound detection device 162. In some embodiments, the sound processing engine 180 operates to filter the voice input 156 (e.g., a voice request of the user query 120) from noises included in the detected sounds. Various noise cancellation technologies, such as active noise control or canceling technologies or passive noise control or cancelling technologies, can be used to filter the voice input from ambient noise. In examples, the sound processing engine 180 filters out omni-directional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, the sound processing engine 180 at least partially operates to analyze a recording of sounds captured using the sound detection device 162, using speech recognition technology to identify words spoken by the user. In addition or alternatively, other computing devices, such as the media delivery system 104 (e.g., a voice interaction server 204 thereof) can cooperate with the media playback device 102 for such analysis. The words may be recognized as commands from the user that alter the playback of media content and/or other functions or aspects of the media playback device 102. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the media playback device 102 such as volume, dominant frequency or frequencies, etc. These sound properties may be used to make inferences about the environment proximate to the media playback device 102.

The voice interaction engine 182 operates to cooperate with the media delivery system 104 (e.g., a voice interaction server 204 thereof) to identify a command (e.g., a user intent) that is conveyed by the voice input 156. In some embodiments, the voice interaction engine 182 transmits the voice input 156 (e.g., of a user) that is detected by the sound processing engine 180 to the media delivery system 104 so that the media delivery system 104 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 104 (e.g., the voice interaction server 204 thereof) to provide a voice assistant that performs various voice-based interactions with the user, such as voice feedbacks, voice notifications, voice recommendations, and other voice-related interactions and services.

Referring still to FIG. 2, the media delivery system 104 includes a media content server 200, a media content search server 202, a voice interaction server 204, and a user command interpretation server 206.

The media delivery system 104 comprises one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200, the media content search server 202, the voice interaction server 204, and the user command interpretation server 206 are provided by separate computing devices. In other embodiments, the media content server 200, the media content search server 202, the voice interaction server 204, and the user command interpretation server 206 are provided by the same computing device(s). Further, in some embodiments, at least one of the media content server 200, the media content search server 202, the voice interaction server 204, and the user command interpretation server 206 is provided by multiple computing devices. For example, the media content server 200, the media content search server 202, the voice interaction server 204, and the user command interpretation server 206 may be provided by multiple redundant servers located in multiple geographic locations.

Although FIG. 2 shows a single media content server 200, a single media content search server 202, a single voice interaction server 204, and a single user command interpretation server 206, some embodiments include multiple media content servers, media content search servers, voice interaction servers, and user command interpretation servers. In these embodiments, each of the multiple media content servers, media content search servers, voice interaction servers, and user command interpretation servers may be identical or similar to the media content server 200, the media content search server 202, the voice interaction server 204, and the user command interpretation server 206, respectively, as described herein, and may provide similar functionality with, for example, greater capacity and redundancy and/or services from multiple geographic locations. Alternatively, in these embodiments, some of the multiple media content servers, the media content search servers, the voice interaction servers, and/or the user command interpretation servers may perform specialized functions to provide specialized services. Various combinations thereof are possible as well.

The media content server 200 transmits stream media to media playback devices such as the media playback device 102. In some embodiments, the media content server 200 includes a media server application 212, a processing device 214, a memory device 216, and a data communication device 218. The processing device 214 and the memory device 216 may be similar to the processing device 148 and the memory device 150, respectively, which have each been previously described. Therefore, the description of the processing device 214 and the memory device 216 are omitted for brevity purposes.

The data communication device 218 operates to communicate with other computing devices over one or more networks, such as the network 106. Examples of the data communication device include one or more wired network interfaces and wireless network interfaces. Examples of such wireless network interfaces of the data communication device 218 include wireless wide area network (WWAN) interfaces (including cellular networks) and wireless local area network (WLANs) interfaces. In other examples, other types of wireless interfaces can be used for the data communication device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items from the media content server 200. For example, in FIG. 2, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As described herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc.

The media content metadata 236 operates to provide various pieces of information (also referred to herein as attribute(s)) associated with the media content items 234 and/or the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML, or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 2, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

In some embodiments, the playlist 239 includes one or more playlist descriptions. The playlist descriptions include information associated with the playlist 239. The playlist descriptions can include a playlist title. In some embodiments, the playlist title can be provided by a user using the media playback device 102. In other embodiments, the playlist title can be provided by a media content provider (or a media-streaming service provider). In yet other embodiments, the playlist title can be automatically generated.

Other examples of playlist descriptions include a descriptive text. The descriptive text can be provided by the user and/or the media content provider, which is to represent the corresponding playlist 239. In other embodiments, the descriptive text of the playlist description can be obtained from one or more other sources. Such other sources can include expert opinion (e.g., music reviews or classification of music into genres), user opinion (e.g., reviews through websites, chatrooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chat rooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist 239 includes a list of media content item identifications (IDs). The list of media content item identifications includes one or more media content item identifications that refer to respective media content items 234. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 239 are created by a media streaming service provider. For example, such provider-created playlists can be automatically created by the media delivery system 104. In some embodiments, a provider-created playlist can be customized to a particular user or a particular group of users. By way of example, a playlist for a particular user can be automatically created by the media delivery system 104 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 2, the media content search server 202 operates to perform media content search in response to a media content search request, such as the user query 120 (FIG. 1). In some embodiments, the media content search server 202 includes a media content search application 250, a processing device 252, a memory device 254, and a data communication device 256. The processing device 252, the memory device 254, and the data communication device 256 may be similar to the processing device 214, the memory device 216, and the data communication device 218, respectively, which have each been previously described.

In some embodiments, the media content search application 250 operates to interact with the media playback device 102 and provide selection of one or more media content items based on the user query 120. As described herein, the media content search application 250 can include the media content steering engine 110 (FIG. 1). The media content search application 250 can interact with other servers, such as the media content server 200, the voice interaction server 204, and the user command interpretation server 206, to perform media content search.

Referring still to FIG. 2, the voice interaction server 204 operates to provide various voice-related functionalities to the media playback device 102. In some embodiments, the voice interaction server 204 includes a voice recognition application 270, a speech synthesis application 272, a processing device 274, a memory device 276, and a data communication device 278. The processing device 274, the memory device 276, and the data communication device 278 may be similar to the processing device 214, the memory device 216, and the data communication device 218, respectively, which have each been previously described.

In some embodiments, the voice recognition application 270 and the speech synthesis application 272, either individually or in combination, operate to interact with the media playback device 102 and enable the media playback device 102 to perform various voice-related functions, such as voice media content search, voice feedback, voice notifications, etc.

In some embodiments, the voice recognition application 270 is configured to perform speech-to-text (STT) conversion, such as receiving a recording of voice command (e.g., an utterance) and converting the utterance to a text format.

In some embodiments, the speech synthesis application 272 is configured to perform text-to-speech (TTS) conversion, so that a language text is converted into speech. Then, the voice interaction server 204 can transmit an audio data or file for the speech to the media playback device 102 so that the media playback device 102 generates a voice assistance to the user using the transmitted audio data or file.

Referring still to FIG. 2, the user command interpretation server 206 operates to analyze the user command (e.g., the utterance) to determine appropriate actions to take according to the user command. In some embodiments, the user command interpretation server 206 analyzes a text version of a user command (e.g., a text version of the utterance). In other embodiments, a recording of the user command can be used for such analysis without converting into a text format.

In some embodiments, the user command interpretation server 206 includes a natural language understanding (NLU) application 280, a processing device 282, a memory device 284, and a data communication device 286. The processing device 282, the memory device 284, and the data communication device 286 may be similar to the processing device 214, the memory device 216, and the data communication device 218, respectively, which have each been previously described.

In some embodiments, the NLU application 280 operates to analyze the text format of the utterance to determine functions to perform based on the utterance. The NLU application 280 can use a natural language understanding algorithm that involves modeling human reading comprehension, such as parsing and translating an input according to natural language principles.

Figure 3:
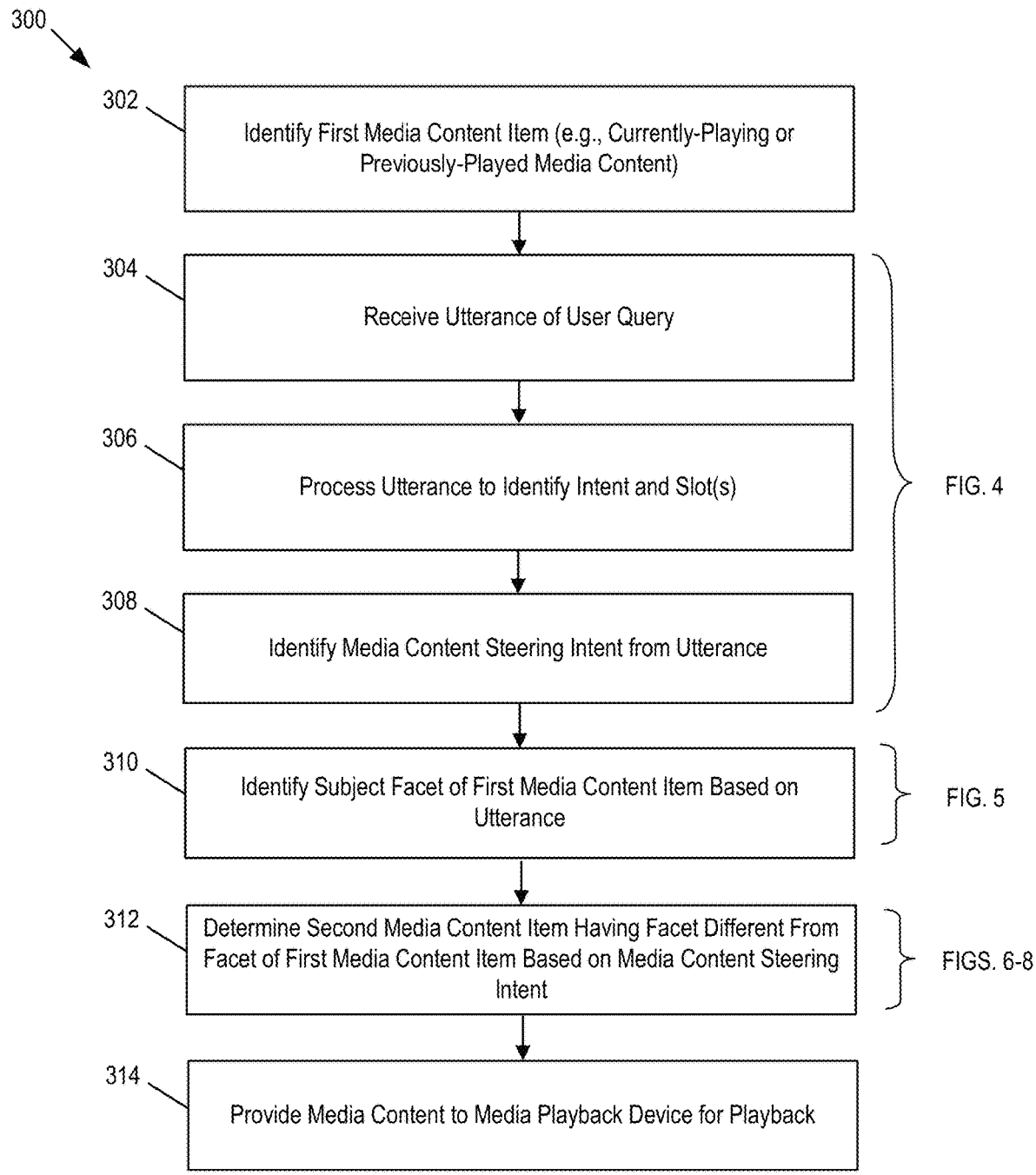
FIG. 3 is a flowchart of an example method for steering media content in response to a user query.

FIG. 3 is a flowchart of an example method 300 for steering media content in response to a user query 120. The method 300 is described with further reference to FIGS. 4-8. In at least some embodiment, the method 300 can be performed at least partially by the system 100 as described herein. For example, the method 300 is at least partially performed by the media delivery system 104 that interacts with the media playback device 102. In other embodiments, the method 300 can be at least partially performed by the media playback device 102 that interacts with the media delivery system 104. In yet other embodiments, the method 300 can be at least partially performed by the media playback device 102 and the media delivery system 104.

At operation 302, the system 100 operates to identify the first media content item 124. As described herein, the first media content item 124 includes media content that is currently playing via, for example, the media playback device 102. In alternative embodiments, where there is no media content that is currently playing, the first media content item 124 that the system 100 can operate to identify is the media content that has been previously played and is currently paused or stopped. Other media content can be the first media content item 124 in other embodiments.

The identification of the first media content item 124 playing media content can be performed in various manners. In some embodiments, the media delivery system 104 can receive a media content identifier (e.g., a media content identifier 198 in FIG. 2) from the media playback device 102, which identifies the media content item that is currently playing on the media playback device 102 or that has previously played on the media playback device 102. In some embodiments, such a media content identifier can be stored in the media content cache 172 (FIG. 2) of the media playback device 102, and transmitted to the media delivery system 104. In other embodiments, with or without the media content identifier, the media delivery system 104 can retrieve, from one or more databases thereof, playback information about the media content that is currently being streamed to the media playback device 102 or that has been streamed to the media playback device 102.

Figure 4:
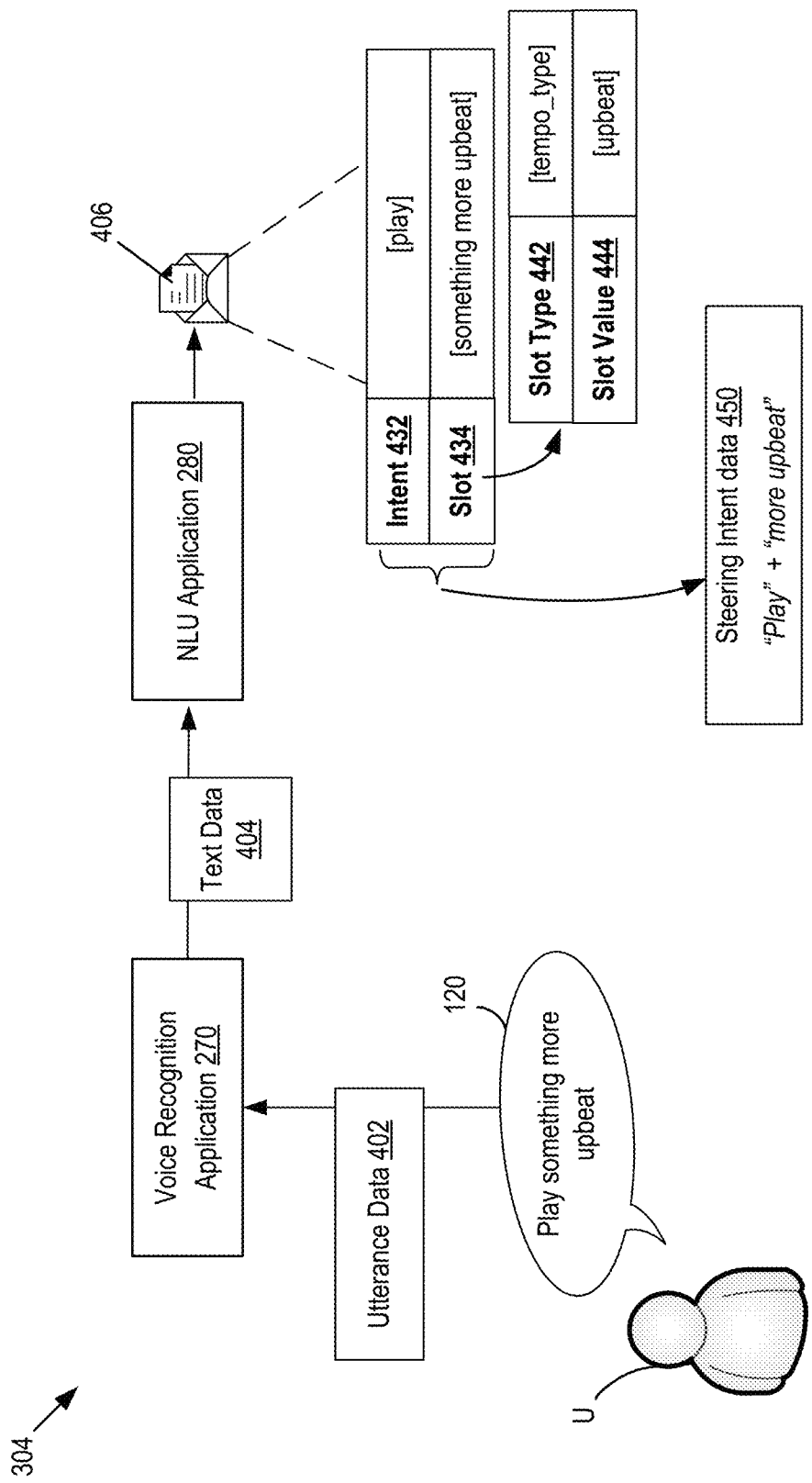
FIG. 4 is a block diagram that illustrates an example utterance analysis operation in the method of FIG. 3.

At operation 304, the system 100 receives the utterance of the user query 120. In some embodiments, the user query 120 is received through the media playback device 102. As illustrated in FIG. 4, the utterance of the user query 120 can be stored and received as utterance data 402 by the media delivery system 104. In the illustrated example, the utterance of the user query 120 includes "play something more upbeat."

The utterance data 402 is data describing the utterance of the user query 120. In at least some embodiments, the utterance data 402 is an audio recording that contains the utterance being spoken. In some examples, the utterance data 402 is received as an entire audio data file. For instance, the media playback device 102 buffers the utterance data 402 as it is obtained from the sound detection device 162. The buffered utterance data 402 is then sent to the media delivery system 104 for processing. In other instances, the media playback device 102 streams the utterance data 402 to the media delivery system 104 in real-time as the utterance data 402 is received from the sound detection device 162 of the media playback device 102. In some examples, the utterance data 402 is stored (e.g., by the media delivery system 104) in a data store after it is received.

In some embodiments, the media playback device 102 receives the user query 120 from user U while media content is being currently played. In other embodiments, the media playback device 102 receives the user query 120 when media content has been played and now paused or stopped. The user U may want to listen to other media content with different attribute than the currently-playing or previously-played media content. In the illustrated example, the user U wants to listen to media content that is more upbeat than the first media content item 124 (e.g., the currently-playing or previously-played media content), and thus provides the user query 120 of "play something more upbeat."

At operation 306, the system 100 operates to process the utterance of the user query 120. In some embodiments, the operation 306 can be performed by the media delivery system 104. Referring to FIG. 4, some embodiments of the operation 306 are described in which the media delivery system 104 in the system 100 processes the utterance data 402.

As illustrated in FIG. 4, the operation 306 can include performing automated speech recognition on the utterance data 402 to obtain text data 404. In some embodiments, the voice recognition application 270 in the voice interaction server 204 can receive and process the utterance data 402 to generate the text data 404.

In some embodiments, performing automated speech recognition includes providing the utterance data 402 as input to an automated speech recognition system (e.g., the voice recognition application 270 of the voice interaction server 204) and receiving the text data 404 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION.

Once the text data 404 is obtained after processing the utterance data 402, the text data 404 is further processed to generate structured interpretation data 406. The structured interpretation data 406 include information that interprets the utterance of the user query 120.

In some embodiments, the structured interpretation data 406 is obtained by the natural language understanding (NLU) system (e.g., the NLU application 280). The structured interpretation data 406 is used to perform a fulfillment strategy based on a received utterance. As described herein, the media delivery system 104 can include the user command interpretation server 206 that operates the NLU application 280, and the media playback device 102 can receive an utterance of the user query 120 and provide the utterance to the media delivery system 104 for processing at the user command interpretation server 206. This is for example purposes only, and other configurations are possible. For instance, the NLU application 280 is locally saved and performed in the media playback device 102.

The structured interpretation data 406 include an intent 432 and a slot 434 that are determined from the text data 404. The intent 432 describes a general intent of the text data 404. The slot 434 is a key-value pair that describes a portion of the text data 404 having a specific meaning. In some embodiments, the slot 434 can be obtained from at least a portion of the text data 404 representing the utterance other than the intent 432. In other embodiments, the slot 434 can be obtained from at least a portion of the entire text data 404 (including the intent 432). Such a key-value pair of the slot 434 includes a slot type 442 (as a key) and a slot value 444 (as a value).

In the illustrated example herein, if the text data 404 represents the utterance of "play something more upbeat" as input, the intent 432 is "play" and the slot 434 can include "something more upbeat," "more upbeat," "upbeat," or any of their variants.

Further, the slot 434 can include at least one key-value pair (e.g., at least one pair of slot type 442 and slot value 444). In the illustrated example, the slot 434 can be a key-value pair of {tempo_type: upbeat}. Other variants are possible for the key-value pair of the slot 434, such as {mood: upbeat}, in other embodiments.

In some embodiments, the text data 404 can include a single slot 434 and a single intent 432. In other embodiments, the NLU application 280 can return a plurality of slots 434 and/or a plurality of intents 432 from the text data 404. In yet other embodiments, the text data 404 provides an intent 432 but no slot 434. For example, where the text data 404 is "play," the NLU application 280 can return the intent 432 being "play", but will not result in any slot 434 (e.g., the text data 404 does not include a description of what to play). In other examples, the text data 404 can include one or more slots 434 but no intent. For instance, where the text data 404 is "All Along the Watchtower by Jimi Hendrix," the operation 430 can result in two slots 434 (e.g., {Song: All Along the Watchtower} and {Artist: Jimi Hendrix}) but no intent 432 (e.g., the text data 404 does not include a description of what do to with the song and artist, such as search, play, or save).

Referring back to FIG. 3, at operation 308, the system 100 operates to identify a media content steering intent from the utterance of the user query 120. In some embodiments, as illustrated in FIG. 4, steering intent data 450 is generated to indicate the media content steering intent. The media content steering intent is a user's intent identified from the utterance of the user query 120 that requests for other media content with one or more attributes different from media content that is currently playing or has previously been played (e.g., the first media content item 124 in FIG. 1). In this regard, when the user query 120 includes such a media content steering intent, the user query 120 is determined as a media content steering query or request. As described herein, the media content steering intent is identified from the utterance of the user query that includes a command to retrieve media content having a facet different from a corresponding facet of the currently-playing or previously-played media content.

In some embodiments, the media content steering intent is identified when the user query 120 includes one or more words having a relative meaning or the like which can be used to compare between two or more media content items or contexts. Some examples of such relative words include any terms or expressions including comparative words (e.g., "new," "newer," "newest," "old," "older," "oldest," etc.), quantifying words (e.g., "all," "enough," "only," "more," "most," "less," "least," "no," "none," "not any," "some," "any," "a lot of," "lots of," "plenty of," "much," "a little/little/very little," "a great deal of," "a large amount/number/quantity of," "many," "a few/few/very few," "a number (of)," "several," "a majority of," etc.), and any other words or phrases which can convey relative meaning.

The relative words in the utterance can provide values of one or more of the slots 434 identified from the text data 404. In the illustrated example where the text data 404 includes "play something more upbeat" converted from the utterance of the user query 120, the values of the slots 434, such as "more" or "more upbeat" can be identified as relative words of the text data 404. In other embodiments, relative words of the text data 404 can be identified from the value of the intent 432 that is determined as "play . . . more" or "play . . . more upbeat" in the above example. In yet other embodiments, relative words of the text data 404 can be identified in other methods.

As illustrated in FIG. 4, in some embodiments, the NLU application 280 in the media delivery system 104 can operate to identify the media content steering intent and generate the steering intent data 450 from the utterance of the user query 120. In some embodiments, the media content steering intent is identified from the structured interpretation data 406. For example, the media content steering intent is identified by determining whether at least one of the intent 432 and the slot 434 includes one or more relative words which can be used to compare between attributes of two or more media content items or contexts.

Figure 5:
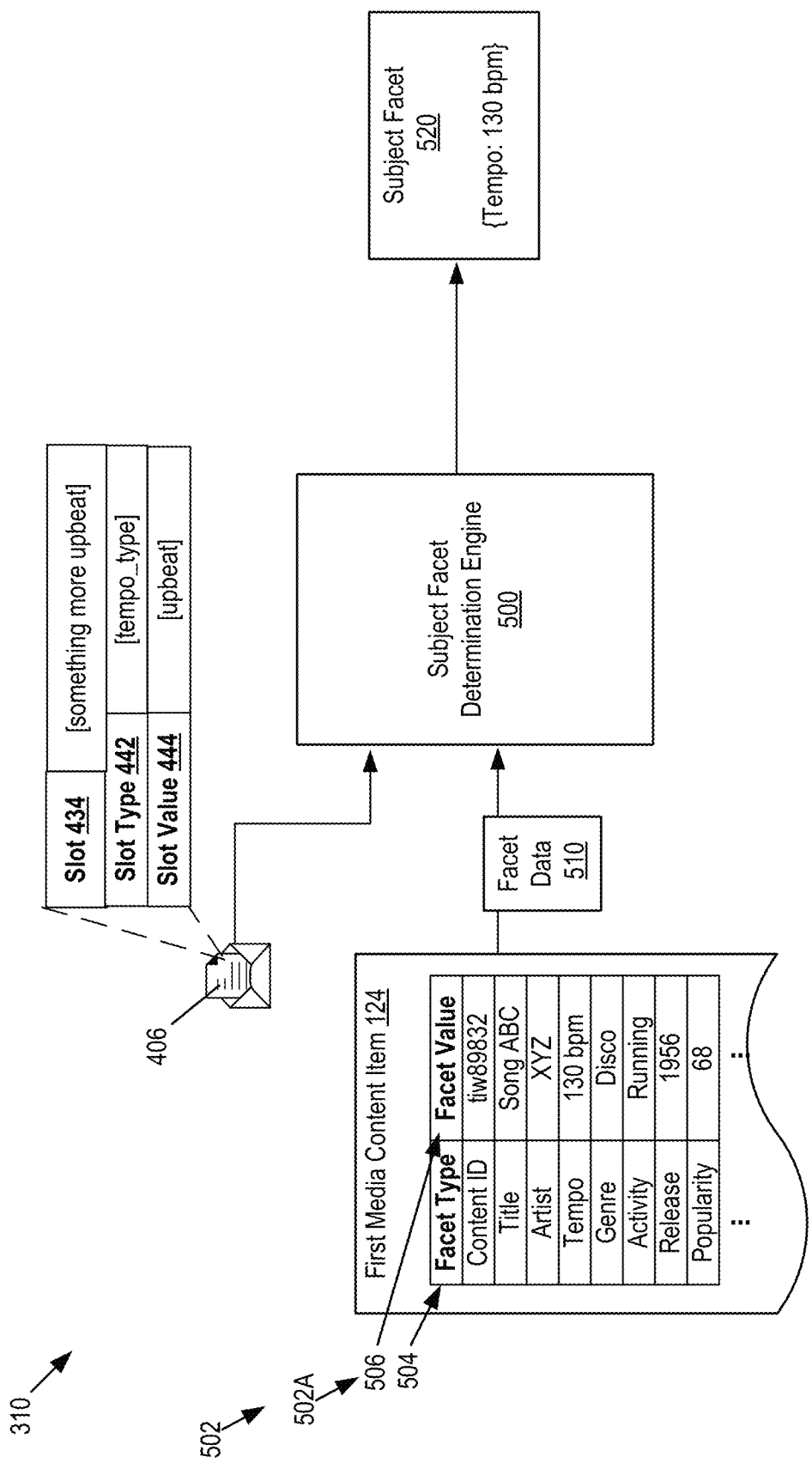
FIG. 5 is a block diagram that illustrates an example subject facet determination operation in the method of FIG. 3.

Referring back to FIG. 3, at operation 310, the system 100 operates to identify a facet 502A (FIG. 5) of the first media content item 124 based on the utterance of the user query 120. The operation 310 is described with further reference to FIG. 5. As illustrated in FIG. 5, the operation 310 can be performed by the media delivery system 104. In some embodiments, the operation 310 can be performed at least by the media content search application 250 of the media content search server 202 in the media delivery system 104, as shown in FIG. 2. For example, the media content steering engine 110 of the media content search application 250 can be configured to at least partially perform the operation 310. In the illustrated example of FIG. 5, a subject facet determination engine 500 operates to perform the operation 310. The subject facet determination engine 500 can be included in the media delivery system 104, such as in the media content steering engine 110 of the media content search application 250.

A facet 502 (including 502A and 502B) of media content includes information about an attribute of the media content. In some embodiments, a media content item has a plurality of facets 502 that describe various attributes of the media content items, such as attributes as identified in the media content metadata 236 (FIG. 2). For example, the facets 502 include information that is similar to various pieces of metadata as described with reference to FIG. 2. For example, the facets 502 can include information associated with the acoustic metadata (e.g., temporal information such as tempo, rhythm, beats, downbeats, tatums, patterns, sections, or other structures; and acoustic metadata such as melody, pitch, harmony, timbre, chroma, loudness, vocalness, or other possible features), cultural metadata (e.g., styles, genres, moods, themes, similar artists and/or songs, rankings, etc.), and/or explicit metadata (e.g., song titles, artist and composer names, other credits, album cover art, publisher name and product number, and other information). In some embodiments, the facets 502 of a media content item can be obtained from metadata 236 associated with the media content item. The facets 502 can be obtained in other ways in other embodiments.

In some embodiments, as illustrated in FIG. 5, each facet 502 includes a key-value pair which can include a facet type 504 (as a key) and a facet value 506 (as a value). Each media content item, such as the first media content item 124 and the second media content item 126, has a plurality of facets 502, each of which includes a pair of facet type 504 and facet value 506. Examples of the facet types 504 include a media content ID, title, artist, tempo, genre, activity, release date, popularity, mood, geographic information, hits, deep cut, and any other available attributes. Further examples of the facet types include any types of attributes as found in the media content metadata 236 (FIG. 2) and other available sources as described herein. The facet values 506 include values for the corresponding facet types 504 that are associated with the particular media content item.

In some embodiments, the subject facet determination engine 500 can receive facet data 510 associated with the first media content item 124. The facet data 510 include information about at least some of the facets 502A of the first media content item 124. Further, the subject facet determination engine 500 can receive information about the utterance of the user query 120 and use the information to identify at least one subject facet 520 from the facet data 510. The subject facet 520 can be selected from the facets 502A of the first media content item 124 and corresponds to the information of the utterance of the user query 120 (e.g., the slot 434, such as at least one of the slot type 442 and the slot value 444, as described below). The subject facet 520 is a facet 502A that needs to be referred to in order to determine the second media content item 126 according to the user query 120.

In some embodiments, the subject facet determination engine 500 can use the structured interpretation data 406 to identify at least one of the facets 502A (i.e., the subject facet 520) of the first media content item 124 that corresponds to the steering intent that is contained and identified in the structured interpretation data 406. For example, the slot 434 obtained from the structured interpretation data 406 can be used to determine a facet 502A of the first media content item 124 that will be used to determine the second media content item 126 that may appropriately reflects the steering intent in the utterance of the user query 120. Therefore, the subject facet 520 of the first media content item 124 is selected from the facets 502A of the first media content item 124 and corresponds to the information of the slot 434, such as at least one of the slot type 442 and the slot value 444.

In addition or alternatively, other information, such as the intent 432 and/or the steering intent data 450, can be used to determine a facet 502 that is need to determine the second media content item 126.

In the illustrated example where the utterance of the user query 120 includes "play something more upbeat," the structured interpretation data 406 includes the slot 434 of "something more upbeat." This slot 434 is represented by a pair of slot type 442 and slot value 444. In the illustrated example of FIG. 6, the pair of slot type 442 and slot value 444 is {tempo_type:upbeat}. The slot type 442 can be used to identify the facet type 504 of the first media content item 124 that is needed for the media content steering process. In this example, as the slot type 442 is "tempo_type," the corresponding facet type 504 of "tempo" can be selected. Then, the facet value 506 for "tempo" in the first media content item 124 is found to be 130 bpm. Based on the identified facet type and value, the subject facet 520 can be determined as {tempo:130 bpm} in this example.

Referring back to FIG. 3, the method 300 can continue at operation 312. The operation 312 is described with further reference to FIGS. 6-8.

At the operation 312, the system 100 operates to determine a second media content item 126 having a facet 502B that is relatively different from the corresponding facet 502A (i.e., the subject facet 520) of the first media content item 124. Such difference between the facet 502A (i.e., the subject facet 520) of the first media content item 124 and the corresponding facet 502B of the second media content item 126 can be determined based on the media content steering intent in the utterance of the user query 120. As described herein, the second media content item 126 is selected to be personalized to the particular user (e.g., the user U who provided the user query 120).

Figure 6:
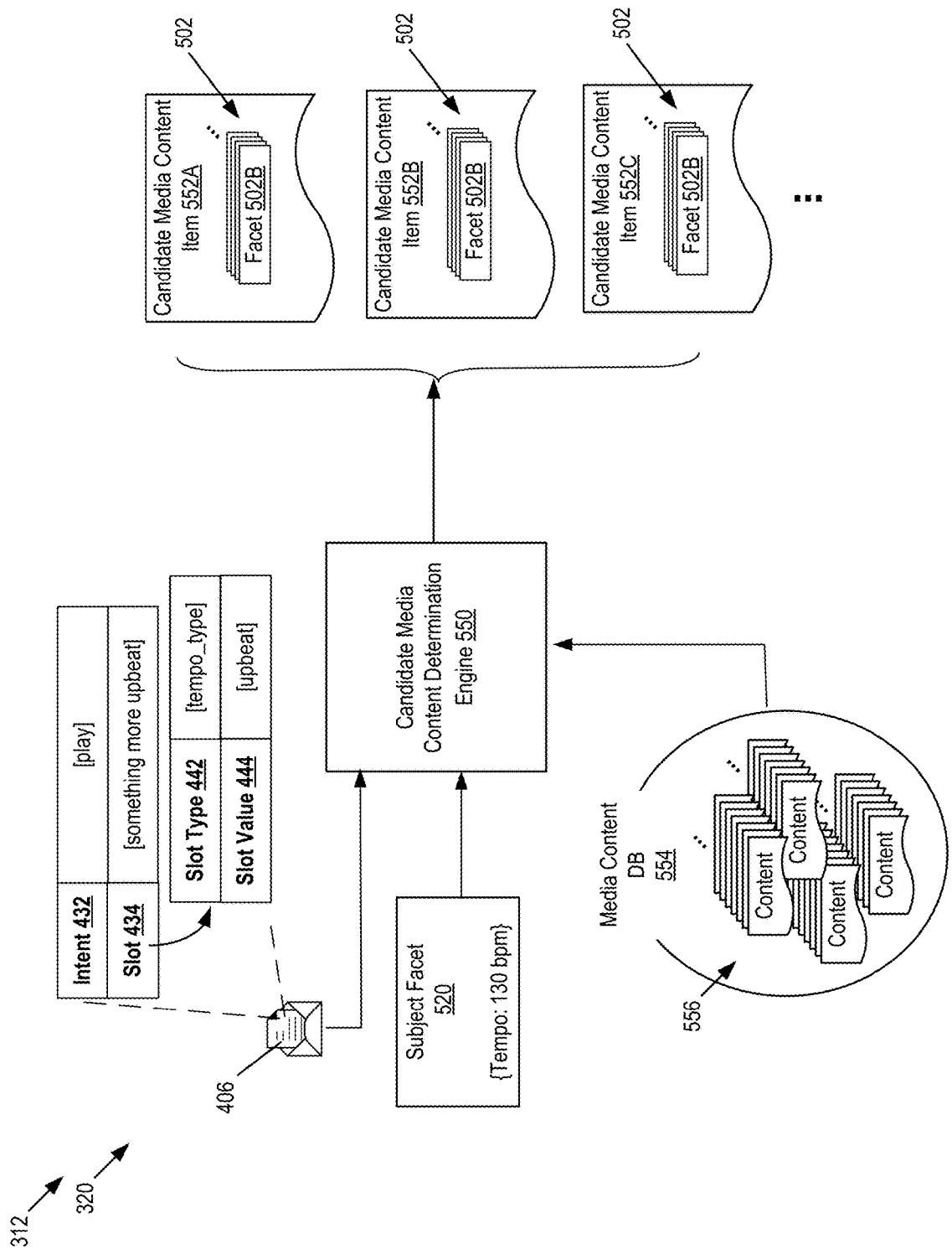
FIG. 6 is a block diagram that illustrates an example candidate media content determination operation in the method of FIG. 3.

In some embodiments, the operation 312 includes a first operation 320 (FIG. 6). In addition, the operation 312 can further include a second operation 322 (FIG. 8). The first operation 320 is described with reference to FIGS. 6 and 7, and the second operation 322 is described with reference to FIG. 8. Although it is primarily described that the first operation 320 is performed prior to the second operation 322, it is understood that the second operation 322 can be performed before the first operation 320, or that the first operation 320 and the second operation 322 can be combined and performed as a single step.

The operation 312 (including the operations 320 and 322) can be performed by the media delivery system 104. In some embodiments, the operation 312 can be performed at least by the media content search application 250 of the media content search server 202 in the media delivery system 104, as shown in FIG. 2. For example, the media content steering engine 110 of the media content search application 250 can be configured to at least partially perform the operation 312. In the illustrated example of FIG. 6, a candidate media content determination engine 550 operates to at least part of the operation 312, such as the first operation 320. In the illustrated example of FIG. 8, a steered media content determination engine 590 operates to at least part of the operation 312, such as the second operation 322.

Referring to FIG. 6, at the first operation 320, the system 100 operates to determine one or more candidate media content items 552 (including 552A, 552B, 552C, etc.), from which the second media content item 126 can be selected. In some embodiments, the candidate media content determination engine 550 operates to receive data of the subject facet 520 and the information (e.g., the structured interpretation data 406) about the utterance of the user query 120. The candidate media content determination engine 550 further operates to retrieve a media content database 554 (e.g., the media data store 226 in FIG. 2), which stores a plurality of media content items 556 (e.g., the media content items 234 in FIG. 2), and select the candidate media content items 552 from the media content database 554 based on the subject facet 520 and the utterance of the user query 120.

In some embodiments, each of the candidate media content items 552 is selected to have a facet 502B that corresponds to the subject facet 520 and has a different value from the subject facet 520 according to the information (e.g., the structured interpretation data 406) about the utterance of the user query 120. An example method of selecting the candidate media content items 552 is illustrated in FIG. 7.

Figure 7:
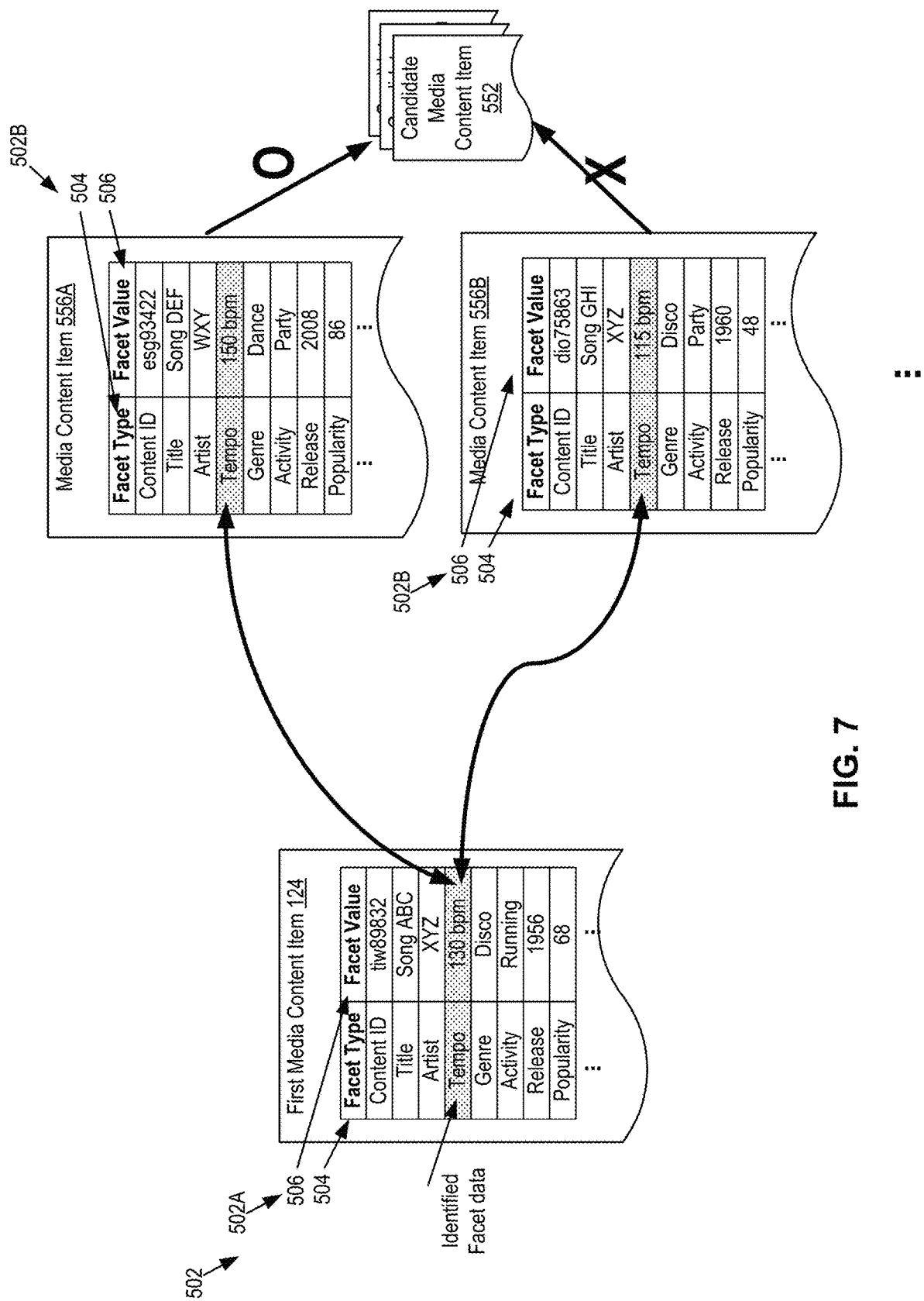
FIG. 7 illustrates the candidate media content determination operation of FIG. 6.
Figure 8:
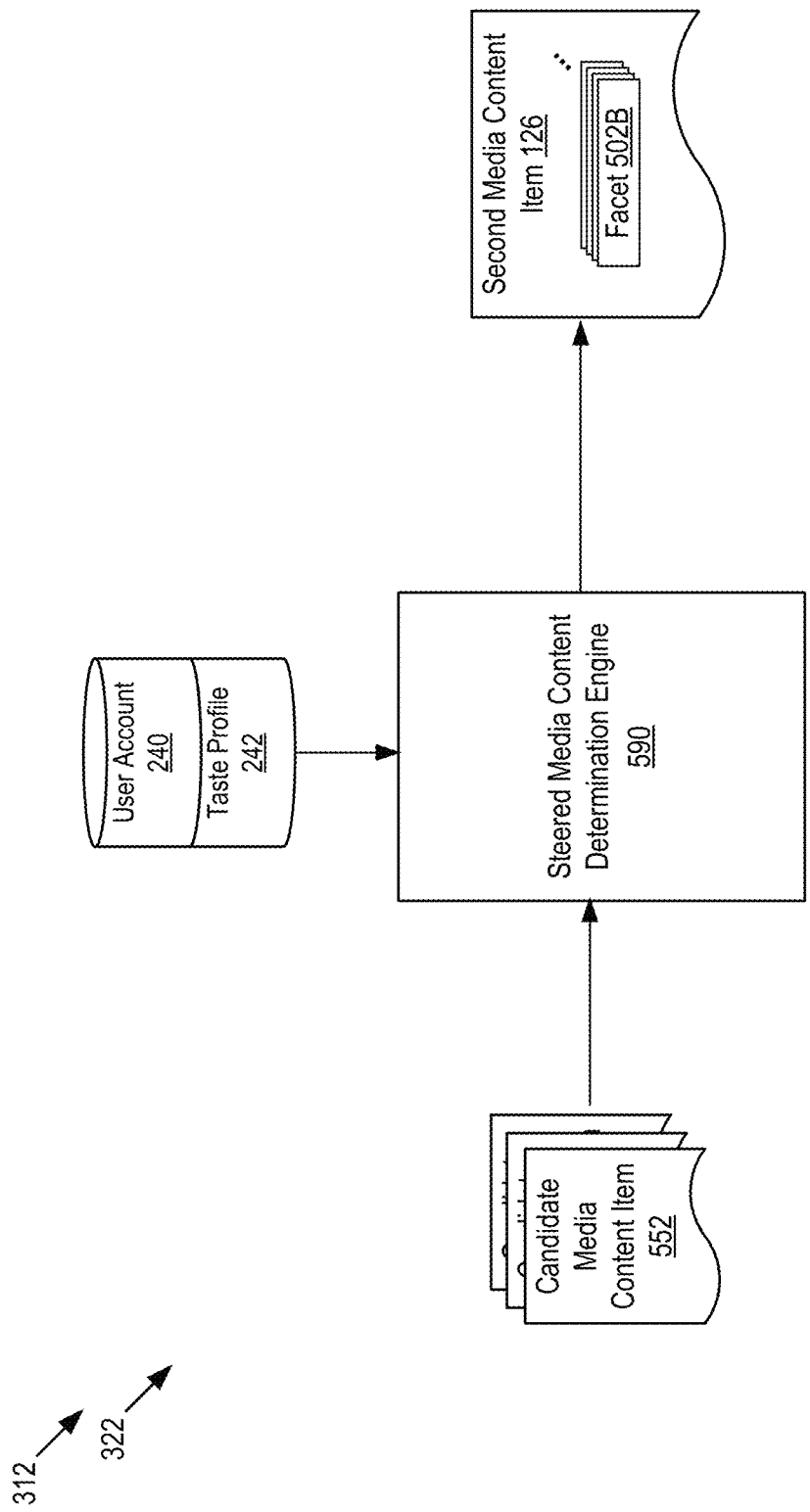
FIG. 8 is a block diagram that illustrates an example steered media content determination operation in the method of FIG. 3.

Referring to FIG. 7, one or more candidate media content items 552 are determined by comparing the facets 502A of the first media content item 124 with the facets 502B of the media content items 556 (including 556A, 556B, etc.) from the media content database 554. In some embodiments, the candidate media content items 552 are media content items 124 each having a facet 502B that matches a facet type 504 of the subject facet 520 and has a facet value 506 different from the subject facet 520. The difference in the facet values can be determined based on different facet value representing the information about the utterance of the user query 120, such as the structured interpretation data 406.

In the illustrated example of FIG. 7, the facets 502A of the first media content item 124 are compared with the facets 502B of each of the media content items 556. For example, among other facet types, the facet type 504 to be referred to for comparison is determined according to the subject facet 520. Because the subject facet 520 is associated with tempo, the facet type 504 to be referred to for comparison is selected to be tempo. For the determined facet type 504 (e.g., "tempo" in this example), the facet value 506 of the first media content item 124 is compared with the facet value of each of the media content items 556 so that media content items 556 having facet values 506 that satisfy the information (e.g., the structured interpretation data 406) about the utterance of the user query 120 are selected for the candidate media content items 552. In this example, because the structured interpretation data 406 (e.g., the slot value 444) indicates {more upbeat} or its variants, the media content items 556 that have facet values 506 of tempo higher than the facet value 506 of 130 bpm of the first media content item 124 are selected as the candidate media content items 552. By way of example, in FIG. 7, the media content item 556A has the tempo value greater than the tempo value of the first media content item 124 and thus can be a candidate media content item 522. However, because the media content item 556B has the tempo value less than the tempo value of the first media content item 124, the media content item 556B is not selected as a candidate media content item 552.

In some embodiments, other than the facet type determined based on the subject facet 520, at least one of the facet types of the candidate media content item 552 can match at least one of the facet types of the first media content item 124. In other embodiments, the facet type determined based on the subject facet 520 can be the only facet type that the first media content item 124 and the candidate media content item 552 have in common.

In some embodiments, where there are one or more common facet types between the candidate media content item 522 and the first media content item 124, the candidate media content item 552 can be selected from the pool of media content items 124 such that, for at least one of such common facet types other than the facet type determined based on the subject facet 520, the facet values are the same or similar between the candidate media content item 552 and the first media content item 124. In other embodiments, regardless of the facet values of the facet types other than the facet type determined based on the subject facet 520, the facet values of the facet type determined based on the subject facet 520 are only compared between the first media content item 124 and the media content items 556 to determine the candidate media content item 552.

In other embodiments, the second media content item 126 is determined such that, for the facet type of the subject facet 520, the facet value of the second media content item 126 is relatively different from the facet value of the first media content item 124. In some embodiments, the amount of the relative difference is determined based on a distance between one or more attributes of the first media content item 124 and the steering query 120. For example, the amount of relative difference is obtained using a Euclidean distance between a vector representing the attributes of the first media content item 124 and a vector representing the steering query 120. Other algorithms can be used to calculate the distance between the attributes of the first media content item 124 and the steering query 120.

Referring to FIG. 8, at the second operation 322 of the operation 310, the system 100 operates to determine the second media content item 126 from the candidate media content items 552. In some embodiments, the steered media content determination engine 590 operates to determine one from the candidate media content items 552 as the second media content item 126.

In some embodiments, the steered media content determination engine 590 operates to retrieve the user information (also referred to herein as a user profile), such as the user account 240 and/or the taste profile 242, to select the second media content item 126 from the candidate media content items 552.

In some embodiments, the user information is used to determine the facet value 506 of the second media content item 126 for the facet type 504 matching the subject facet 520. By way of example, if the user information indicates that the user likes music with higher tempo, the second media content item 126 can be selected to have the highest tempo among the candidate media content items 552. In other embodiments, various types of the user information can be used to select one of the candidate media content items 552 as the second media content item 126. Examples of such types of the user information include user preferences and historical information about the user's consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media.

In some embodiments, the steered media content determination engine 590 operates to generate a steered media content identifier 592 (FIG. 2) that identifies the second media content item 126. The steered media content identifier 592 can be used by one or more computing devices, such as the media playback device 102 and the media delivery system 104, to identify, retrieve, transmit, and/or receive the second media content item 126 for playback.

In the operations 320 and 322, it is primarily described that a plurality of candidate media content items 552 are determined and the second media content item 126 is selected from the candidate media content items 552. However, it is also possible in other embodiments that a single media content item can be determined in the operation 320, which then automatically becomes the second media content item 216 without the operation 322.

Referring back to FIG. 3, when the operation 312 is performed, the method 300 can move on to operation 314. At the operation 314, the media delivery system 104 operates to provide the second media content item 126 to the media playback device 102 for playback. In some embodiments, the media delivery system 104 operates to transmit the steered media content identifier 592 to the media playback device 102. In some embodiments, the media playback device 102 can use the steered media content identifier 592 to identify the second media content item 126. In other embodiments, the media playback device 102 operates to transmit the steered media content identifier 592 to the media delivery system 104 to enable the media delivery system 104 to retrieve the second media content item 126 associated with the identifier 592. When the second media content item 126 is determined in the media delivery system 104, the media delivery system 104 operates to stream the second media content item 126 to the media playback device 102 via the network 106, and the media playback device 102 can store and/or play the second media content item 126.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

The invention claimed is:

1. A method for playing media content, the method comprising:
   receiving an utterance of a user query, the utterance comprising one or more relative words;
   determining a slot type and a slot value from a slot, the slot value corresponding to the one or more relative words;
   determining the first facet type based on at least one of an intent, a slot of the utterance, and the slot type;
   identifying at least one first media content item that is currently being played, the at least one first media content item having a first acoustic metadata and a first facet, the first facet having the first facet type and a first facet value, the first acoustic metadata corresponding to the first facet;
   retrieving a pool of candidate media content items from a catalog of media content items, each of the candidate media content items of the pool of candidate media content items having a second acoustic metadata and a second facet, the second acoustic metadata corresponding to the second facet, the second facet having the first facet type and a second facet value, the second facet value being different than the first facet value, wherein the difference between the second facet value for each of the retrieved candidate media content items of the pool of candidate media content items and the first facet value corresponds at least in part to the one or more relative words, wherein a difference in value between the first and second facet values defines a change in an acoustic attribute from the first media content item to each of the candidate media content items of the pool of candidate media content item; and
   selecting a second media content item from the pool of candidate media content items where the second media content item and the first media content item have at least one common facet type other than the first facet type having the same facet value or a similar facet value.

2. The method of claim 1, further comprising:
   retrieving user information associated with a user who provide the utterance;
   wherein the second facet value of the at least one second media content item is determined based on a user profile.

3. The method of claim 1, further comprising:
   prior to receiving the utterance, transmitting a media content signal to a voice-enabled device for playing the at least one first media content item;
   receiving the utterance from the voice-enabled device; and
   converting the utterance to a text version, intent and the slot of the utterance being determined from the text version.

4. The method of claim 1, wherein the first facet type includes at least one of mood, genre activity, tempo, acoustic attributes, artists, popularity, geographic information, release date, hits, and deep cuts.

5. The method of claim 1, wherein the first media content item is a first media content playlist including a plurality of first tracks, and the second media content item is a second media content playlist including a plurality of second tracks.

6. The method of claim 1, wherein the first media content item is included in a first media content playlist, and the second media content item is included in a second media content playlist.

7. A non-transitory computer-readable medium having stored thereon instructions that, when executed by one or more processors cause execution of operations including:
   receiving an utterance, the utterance comprising one or more relative words;
   determining a slot type and a slot value from a slot, the slot value corresponding to the one or more relative words;
   determining a first facet type based on the slot type;
   identifying at least one first media content item that is currently being played, the at least one first media content item having a first acoustic metadata and a first facet, the first facet having the first facet type and a first facet value, the first acoustic metadata corresponding to the first facet;
retrieving a pool of candidate media content items from a catalog of media content items, each of the candidate media content items of the pool of candidate media content items having a second acoustic metadata and a second facet, the second facet having the first facet type and a second facet value, the second acoustic metadata corresponding to the second facet, the second facet being different than the first facet value, wherein the difference between the second facet value for each of the retrieved candidate media content items of the pool of candidate media content items and the first facet value corresponds at least in part to the one or more relative words, wherein a difference in value between the first and second facet values defines a change in an acoustic attribute from the first media content item to each of the candidate media content items of the pool of candidate media content items; and
selecting a second media content item from the pool of candidate media content items where the second media content item and the first media content item have at least one common facet type other than the first facet type having the same facet value.

8. The non-transitory computer-readable medium of claim 7, wherein the instructions further cause execution of operations including:
retrieving user information associated with a user who provide the utterance;
wherein the second facet value of the at least one second media content item is determined based on a user profile.

9. The non-transitory computer-readable medium of claim 7, wherein the instructions further cause execution of operations including:
prior to receiving the utterance, transmitting a media content signal to a voice-enabled device for playing the at least one first media content item;
receiving the utterance from the voice-enabled device; and
converting the utterance to a text version, an intent and the slot of the utterance being determined from the text version.

10. A media playback system comprising:
a media playback device operable to play media content; and
a media delivery system configured to:
receive an utterance from the media playback device, the utterance comprising one or more relative words;
determine a slot type and a slot value from a slot, the slot value corresponding to the one or more relative words;
determine a first facet type based on the slot type;
identify at least one first media content item that is currently being played, the at least one first media content item having a first acoustic metadata and a first facet, the first facet having the first facet type and a first facet value, the first acoustic metadata corresponding to the first facet;
retrieve a pool of candidate media content items from a catalog of media content items, each of the candidate media content items of the pool of candidate media content items having a second acoustic metadata and a second facet, the second acoustic metadata corresponding to the second facet, the second facet having the first facet type and a second facet value, the second facet value being different than the first facet value, wherein the difference between the second facet value for each of the retrieved candidate media content items of the pool of candidate media content items and the first facet value corresponds at least in part to the one or more relative words;
select a second media content item from the pool of candidate media content items where the second media content item and the first media content item have at least one common facet type other than the first facet type having the same facet value; and
transmit the second media content item to the media playback device, wherein a difference in value between the first and second facet values defines a change in an acoustic attribute from the first media content item to the second media content item.

11. The media playback system of claim 10, wherein the media delivery system is configured to:
prior to receiving the utterance, transmit a media content signal to the media playback device for playing the first media content item;
receive the utterance from the media playback device; and
convert the utterance to a text version, an intent and the slot of the utterance being determined from the text version.

12. A media playback system, comprising:
a media playback device operable to play media content; and
a media delivery system configured to:
from the media playback device, receive an utterance of a user of the media playback device in a voice or text format, the utterance comprising one or more relative words;
identify at least one first media content item that is currently being played by the media playback device, the first media content having a first acoustic metadata;
parse the utterance into parts having syntactic roles, comprising an intent and one or more slots, as portions thereof to obtain a steering command, wherein
the intent represents a user request for retrieving a second media content item, the second media content having a second acoustic metadata, and
a slot describes the one or more relative words to compare between attributes of two or more media content items, and includes a pair of a slot type and a slot value, as a key-value pair of a slot, where the slot type is a type of attribute of a media content item, and the slot value corresponding to the one or more relative words and a value of a corresponding slot type associated with a particular media content item;
identify a first facet describing an attribute of the at least one first media content item that matches the slot, the first facet corresponding to the first acoustic metadata, the first facet having a first facet type as a key and a first facet value as a value of a key-value pair of the first facet, where a facet type is a second type of attribute of a media content item, and a facet value is a value of a corresponding facet type associated with a particular media content item;
retrieve from a catalog of media content items, the having the second acoustic metadata and a second facet describing an attribute of the at least one second media content item, the second acoustic metadata corresponding to the second facet, the second facet having a second facet type and a second facet value as a key-value pair of the second facet, the second facet type being the same as the first facet type, and the second facet value being different than the first facet value, wherein the difference between the second facet value for each of the retrieved candidate media content items of the pool of candidate media content items and the first facet value corresponds at least in part to the one or more relative words, wherein the difference in value between the first and second facet values further correspond to a change in an acoustic attribute from the first media content item to each of the candidate media content items of the pool of candidate media content items;

select a second media content item from the pool of candidate media content items where the second media content item and the first media content item have at least one common facet type other than the first facet type having the same facet value; and transmit the second media content item to the media playback device.

13. The media playback system of claim 12, wherein the one or more relative words is contained in the slot value, and wherein the relative difference between the first and second facet values corresponds to the one or more relative words.

14. A method for playing media content, the method comprising:

receiving an utterance of a user query, the utterance comprising one or more relative words;

identifying at least one first media content item that is currently being played, the at least one first media content item having a first acoustic metadata and a first facet, the first acoustic metadata corresponding to the first facet, the first facet having a first facet type and a first facet value;

determining an intent and a slot from the utterance;

determining, from at least one of the intent and the slot, a condition relative to the first facet value;

for a pool of candidate media content items in a catalog of media content items, the candidate media content items of the pool of candidate media content items having a second acoustic metadata and a second facet, the second acoustic metadata corresponding to the second facet, the second facet having the first facet type and a second facet value, determining that the second facet value satisfies the condition, the second facet value being different than the first facet value, the difference between the second facet value and the first facet value corresponding at least in part to the one or more relative words, wherein a difference in value between the first and second facet values defines a change in an acoustic attribute from the first media content item to the candidate media content items of the pool of candidate media content items;

selecting a second media content item from the pool of candidate media content items where the second media content item and the first media content item have at least one common facet type other than the first facet type having the same facet value; and retrieving the second media content item from the catalog of media content items.

\* \* \* \* \*